United States Patent [19]
Kato et al.

[11] Patent Number: 4,723,793
[45] Date of Patent: Feb. 9, 1988

[54] CONSTRUCTION OF DOOR GLASS GUIDE IN MOTOR VEHICLE

[75] Inventors: Kazuyoshi Kato; Motonobu Sugiura, both of Toyota, Japan

[73] Assignee: Toyota Jidosha Kabushiki Kaisha, Aichi, Japan

[21] Appl. No.: 899,816

[22] Filed: Aug. 25, 1986

[30] Foreign Application Priority Data

Aug. 27, 1985 [JP] Japan .......................... 60-130713[U]

[51] Int. Cl.$^4$ ............................................. A62B 35/00
[52] U.S. Cl. ..................................... 280/808; 280/801;
297/477; 297/483; 180/268; 307/10 SB;
296/208
[58] Field of Search ....................... 280/801, 808, 806;
297/483, 477; 296/208; 180/268, 269, 270, 468;
307/9, 10 R, 10 SB; 362/61; 200/61.62

[56] References Cited
U.S. PATENT DOCUMENTS 4,364,583 12/1982 Ogawa .................................. 280/802
4,401,320 8/1983 Okuyama et al. .................... 280/801

*Primary Examiner*—Richard A. Bertsch
*Attorney, Agent, or Firm*—Parkhurst & Oliff

[57] ABSTRACT

A construction of a door glass guide in a motor vehicle includes a door frame in a door of the motor vehicle; a buckle assist secured to the door frame and detachably connected to a tongue plate of a seat belt; a door glass run provided in a guide portion of the door frame, with a main body of the door glass run facing an end edge of a door glass and with lips extending from the main body of the door glass run and being in slidable contact with glass surfaces at the end edge of the door glass, for guiding the door glass in a direction of opening or closing the door glass; and a wire harness disposed in the guide portion in the longitudinal direction of the door glass run and connected to a device for providing a signal when the tongue plate and the buckle assist are unlatched. A wire harness holding portion for holding the wire harness is provided on a surface of the main body of the door glass run which is opposed to the guide portion. The wire harness holding portion includes a pair of clamp pieces for clamping the wire harness, or an expanded portion with a wire harness insertion hole formed therein.

12 Claims, 5 Drawing Figures

PRIOR ART FIG.5

CONSTRUCTION OF DOOR GLASS GUIDE IN MOTOR VEHICLE

BACKGROUND OF THE INVENTION

This invention relates to a construction of a door glass guide in a motor vehicle, and more particularly to improvements in a construction of a door glass guide provided on a door frame of a door of a motor vehicle, to which a two point type automatic belt system is adapted.

The two point type automatic belt system is adapted to automatically hold an occupant in a normal belt pass state (only a shoulder belt) when the occupant is seated at a seat and a door is closed.

As disclosed in U.S. Pat. No. 4,364,583, the two point type automatic belt system of the type described includes: a retractor secured to a center floor tunnel portion; a seat belt linked with the retractor; a guide ring fixed to a frame of a seat, for guiding the seat belt; and a buckle device, to which a tongue plate at the forward end of the seat belt is detachably connected, and secured to a door frame.

When this two point type automatic belt system is used, it suffices to draw the seat belt out of the retractor and to insert the tongue plate thereof into the buckle device. The seat belt is drawn out of the retractor or reversely wound into the retractor as the door is opened or closed. With this arrangement, the occupant can put on or off the seat belt automatically with the tongue plate being inserted in the buckle device, irrespective of his getting in or out of a vehicle.

In the two point type automatic belt system of this type, it is necessary to provide a warning device for detecting and indicating whether or not the seat belt has been reliably put on by the occupant. Further, it is necessary to provide a wire harness for transferring to this warning device a signal indicating that the tongue plate is unlatched from the buckle device.

Here, in FIG. 5, in general, a wire harness W is interposed between a door frame F and a door glass run R mounted in a guide portion G of the door frame F.

In this case, since the wire harness W is interposed between the door frame F and the door glass gun R, in the conventional construction of the glass run R, the set-in properties of the wire harness W are bad and mounting the wire harness W becomes difficult.

More specifically, when the wire harness W is mounted after the door glass run R is secured to the door frame F, the wire harness W must be pushed into a space formed between the door frame F and the door glass run R, and it becomes difficult to push in the wire harness W because the door frame F is small in cross section, thus increasing the difficulty of mounting the wire harness W.

When the door glass run R is inserted into the guide portion G, after the wire harness W is inserted into the guide portion G, the wire harness W moves in the guide portion G and the wire harness R is not located at a predetermined position relative to the door glass run R and the door frame F when the door glass run R is mounted. As a result, a portion of the door glass run R is deformed by the wire harness W, thus considerably worsening the set-in of the door glass R into the door frame F.

Whereas, if the door frame F is changed in its cross section in consideration of the set-in position of the wire harness W, then it is unreasonable as a practical way of remedying the above-described problems, because a section modulus and appearance of the door frame F are lowered.

SUMMARY OF THE INVENTION

The present invention has as its object the provision of a construction of a door glass guide in a motor vehicle, wherein the mounting of the wire harness connected to an unlatch warning device of the seat belt can be improved in terms of the set-in properties and ease of mounting.

To this end, the present invention contemplates a construction of a door glass guide in a motor vehicle, including: a door frame in a door of the motor vehicle, a buckle assist secured to said door frame and detachably connected to a tongue plate of a seat belt; a door glass run provided in a guide portion with a main body of the door glass run facing an end edge of a door glass and with lips extending from the main body of the door glass run and being in slidable contact with the glass surface at the end of the door glass, for guiding the door glass in a direction of opening or closing the door glass; and a wire harness connected to an unlatch warning device disposed in the guide portion in a longitudinal direction of the door glass run and connected to an unlatch warning device for signaling that the tongue plate is unlatched from the buckle assist, wherein a portion for holding the wire harness is provided on a surface of the main body of the door glass run, which is opposed to the guide portion.

To the above end, the present invention contemplates a holding portion consisting of a pair of clamp pieces for clamping the wire harness.

To the above end, the present invention contemplates that the holding portion is located in a recess of the guide portion.

To the above end, the present invention contemplates that at least the forward end of the holding portion is projected into the recess.

To the above end, the present invention contemplates that the holding portion is provided to open at an end face of the main body of the door glass run opposite to the end edge of the door glass.

To the above end, the present invention contemplates that the holding portion is of a generally C-shape in cross section.

To the above end, the present invention contemplates that an expanded portion projecting from said main body of the door glass run into a recess for holding the door glass run formed in said guide portion is provided, and said holding portion is an insertion hole for receiving the wire harness formed in said expanded portion.

According to the present invention, the holding portion for holding the wire harness is provided on the surface of the main body of the door glass run, opposed to the guide portion, so that the wire harness can be secured to the main body of the door glass run. With this arrangement, the main body of the door glass run secured thereto with the wire harness can be inserted in the door frame. Consequently, the need for pushing the wire harness between the door frame and the door glass run, which would otherwise be required as in the conventional case, is eliminated, so that the set-in properties and the workability of mounting the wire harness can be improved.

BRIEF DESCRIPTION OF THE DRAWINGS

FIG. 5 is a sectional view showing the conventional construction of the door glass guide in a motor vehicle.

DETAILED DESCRIPTION OF THE PREFERRED EMBODIMENT

Figure 1:
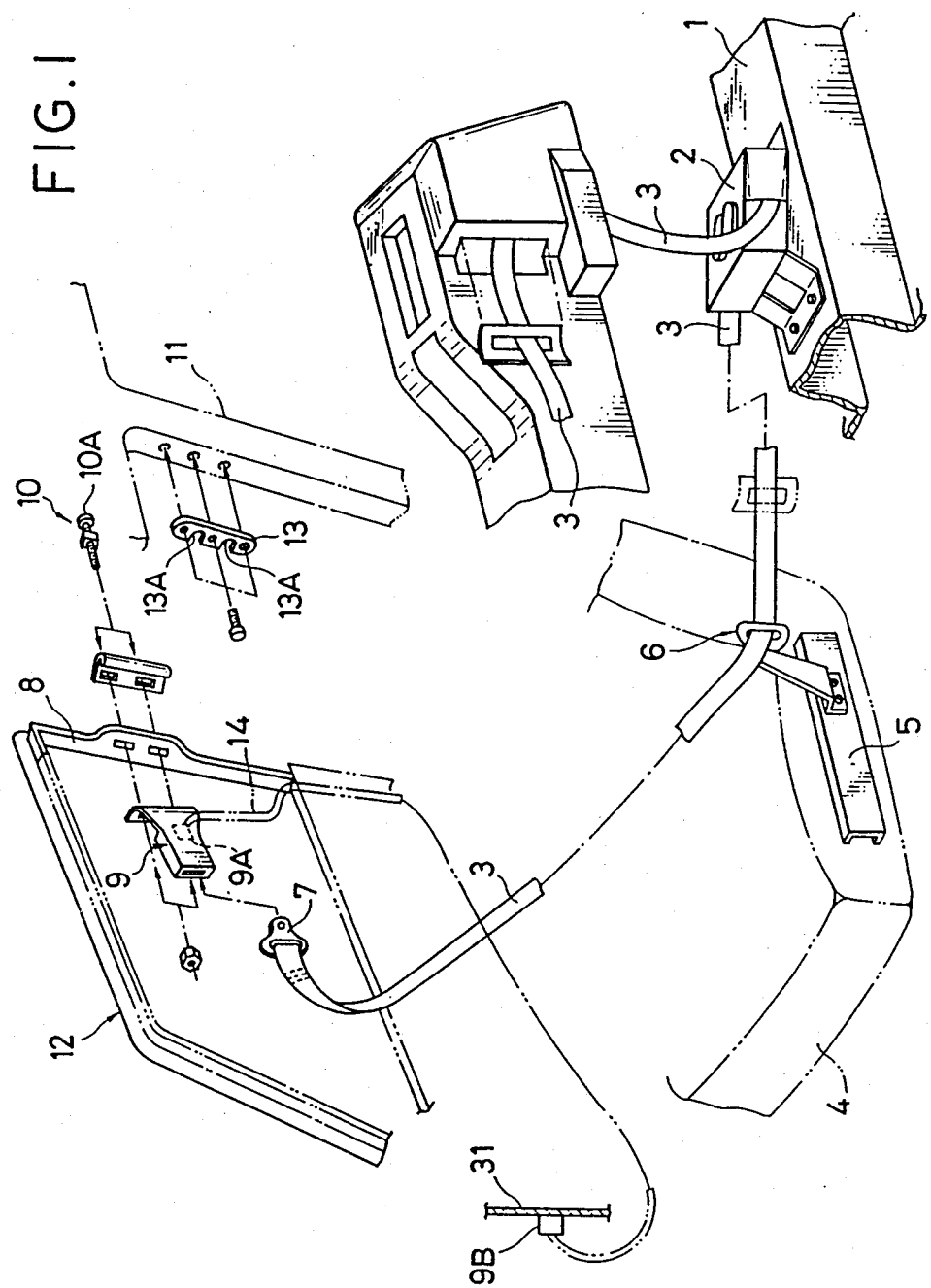
FIG. 1 is a perspective view showing the two point type automatic seat belt in a motor vehicle, to which the present invention is applied.

The embodiments of the present invention will hereinafter be described with reference to the drawings.

First, referring to FIG. 1, the two point type belt system in a motor vehicle, to which the present invention is applied, will be described.

This two point type automatic belt system includes: a retractor 2 secured to a center floor tunnel portion 1; a seat belt 3 linked with the retractor 2; a guide ring 6 fixed to a frame 5 of a seat 4, for guiding the seat belt 3; a buckle assist 9, to which a tongue plate 7 at the forward end of the seat belt 3 is detachably connected and secured to a door frame 8; and a clevis 13, engaging cutouts 13A of which engage heads 10A of mounting bolts 10 of the buckle assist 9 when a door 12 is closed so as to distribute the load of the seat belt 3 acting on the buckle assist 9 to a center pillar 11.

In using this two point type automatic belt system, it suffices to draw the seat belt 3 out of the retractor 2 and to insert the tongue plate 7 into the buckle assist 9. The seat belt 3 is drawn out of the retractor 2 or reversely wound into the retractor 2 as the door 12 is opened or closed. With this arrangement, the occupant can put on or off the seat belt 3 automatically with the tongue plate 7 of the seat belt 3 being inserted in the buckle assist 9, irrespective of his getting in or out of the vehicle.

Figure 2:
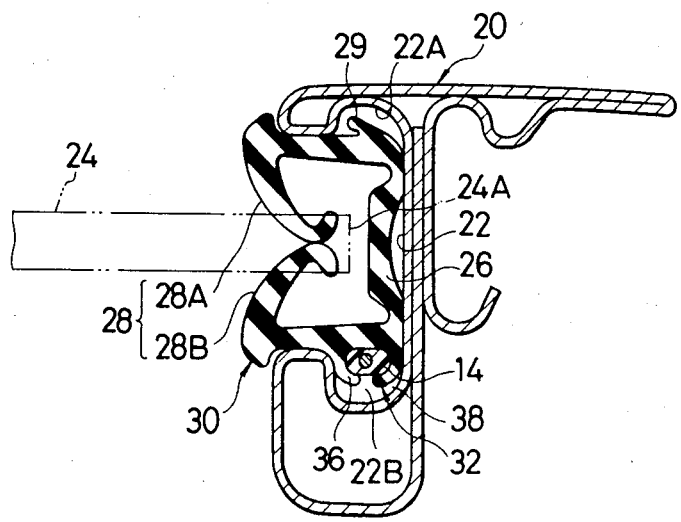
FIG. 2 is a sectional view showing a first embodiment of the construction of the door glass guide in a motor vehicle according to the present invention.

As shown in FIGS. 1 and 2, according to the first embodiment of the present invention, a construction of a door glass guide in a motor vehicle includes:

a door frame 20 in a motor vehicle door having a buckle assist 9 secured thereto;

a tongue plate 7 of the seat belt 3 detachably connected to the buckle assist 9;

a door glass run 30 provided in a guide portion 22 of the door frame 20 with a main body 26 of the door glass run facing an end edge 24A of a door glass 24 and with lips 28 extending from end portions of the main body 26 of the door glass run on the side of the center of the door glass 24 toward the center in the widthwise direction of the main body 26 of the door glass run, and then, toward the opposite sides of the outer periphery of the door frame 20 and being in slidable contact with glass surfaces at the end edge 24A of the door glass 24, for guiding the door glass 24 in a direction of opening or closing thereof; and a wire harness 14 disposed between the guide portion 22 and the door glass run 30 in the longitudinal direction of the door glass run 30, for connecting a sensor 9A for detecting that the tongue plate 7 is unlatched from the buckle assist 9 to an unlatch warning device 9B provided on a dash panel 31;

a holding portion 32 for holding the wire harness 14 provided on a surface of the main body 26 of the door glass run, opposed to the guide portion 22.

The lips 28 of the door glass run include an outer lip 28A contacting the outer surface of the door glass 24 and an inner lip 28B contacting the inner surface of the door glass 24. As shown in the drawing, the main body 26 of the door glass run is of a generally U-shape in cross section, and the outer lip 28A and the inner lip 28B are continuously and integrally formed from the forward end portions on the side of opening of the U-shape.

Furthermore, a fin 29 is projected from the main body 26 of the door glass run on the side of the outer surface thereof in the widthwise direction thereof (the thickness direction of the door glass).

The guide portion 22 is formed to provide a generally U-shape in cross section so as to hold the main body 26 of the door glass run, and has recesses 22A and 22B for holding the door glass run 30 as opposed to an outer portion and an inner portion (on the side of a compartment) in the widthwise direction of the main body 26 of the door glass run.

When the main body 26 of the door glass run is coupled into the guide portion 22, the fin 29 is positioned in one of the recesses of the guide portion 22 and a pair of clamp pieces 36 and 38 of the holding portion 32 are positioned in the other recess 22B.

In the holding portion 32, the pair of clamp pieces 36 and 38 for clamping the wire harness 14 are formed in the longitudinal direction of the door glass run 30, and the holding portion 32 is of a generally C-shape in cross section.

In this embodiment, the holding portion 32 is comprised of a pair of clamp pieces 36 and 38 formed on the surface of the main body 26 of the door glass run which is opposed to the guide portion 22 of the door frame 20 in the longitudinal direction of the door glass run 30, so that the wire harness 14 can be easily mounted to the door glass run 30. With this arrangement, the door glass run 30 with the wire harness 14 coupled thereto is mounted in the guide portion 22 of the door frame 20, so that the wire harness 14 can be easily assembled into a space formed between the door frame 20 and the door glass run 30. Consequently, the need for pushing the wire harness in between the door frame and the door glass run to mount the wire harness is eliminated, thus improving the workability of mounting of the wire harness 14.

Furthermore, the wire harness 14 is pre-mounted into the door glass run 30 by clamping the wire harness 14 with the clamping pieces 36 and 38, whereby the wire harness 14 is fixedly mounted to the door glass run 30, so that, in mounting the door glass run 30 into the guide portion 22 of the door frame 20, the wire harness 14 is locked into a predetermined position, thereby improving the set-in properties of the wire harness 14.

Particularly, in this embodiment, the clamp pieces 36 and 38 are projected into the recess 22B for holding the door glass run 30 of the door frame 20, whereby the clamping pieces 36 and 38 clamping the wire harness are engaged with the recess 22B, so that the door glass run 30 can be positively fixed into the guide portion 22 of the door frame 20.

Figure 3:
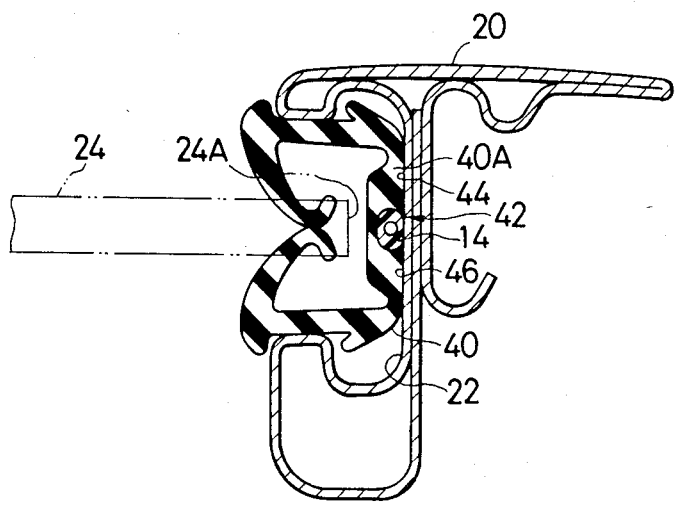
FIG. 3 is a sectional view showing a second embodiment thereof.

Additionally, in this embodiment also, the holding portion 32 is comprised of the clamp pieces 36 and 38 projected into the recess 22B on the side of the compartment of the door frame 20; however, the present invention need not necessarily be limited to this, and, for example, as in the second embodiment shown in FIG. 3, an arrangement may be adopted wherein the holding portion 42 is recessedly formed to provide an opening on a surface of the proximal portion 40A, opposite to a surface opposed to the door glass 24, of the door glass run 40 facing the end edge 24A of the door glass 24. This holding portion 42 is comprised of a pair of clamp pieces 44 and 46.

Figure 4:
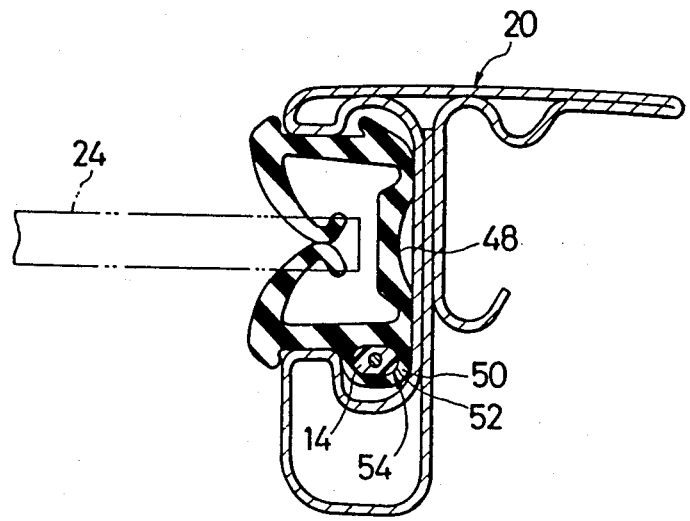
FIG. 4 is a sectional view showing a third embodiment thereof.
Figure 4:
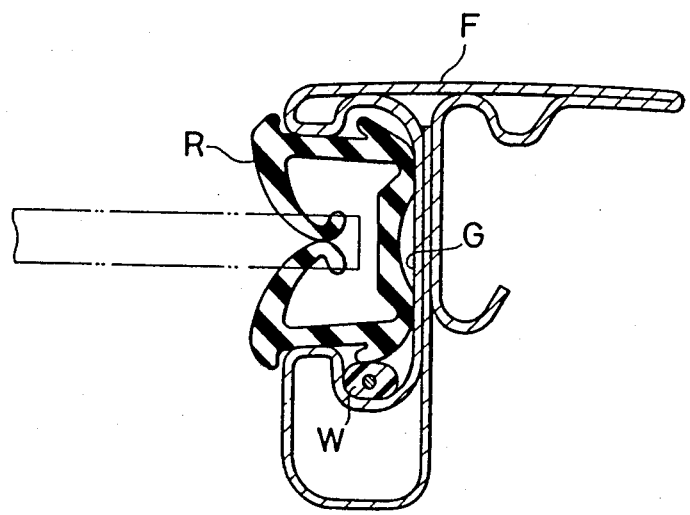

Furthermore, in the above-described embodiments, the holding portions 32 and 42 are comprised of pairs of clamp pieces 36, 38 and 44, 46 respectively. However, the present invention need not necessarily be limited to this, and, as in the third embodiment shown in FIG. 4, an expanded portion 50 may be provided on a main body 48 of the door glass run, and an insertion hole 52 for receiving the wire harness 14 may be formed in the expanded portion 50, thereby forming a holding portion 54.

In the above-described embodiments, the main bodies 26, 40A and 48 are generally U-shaped in cross section. However, the present invention need not necessarily be limited to this, and any other shape, e.g. an L-shape, may be adopted.

What is claimed is:

1. A construction of a door glass guide in a motor vehicle, comprising:
    a door frame in a door of said motor vehicle;
    a buckle assist secured to said door frame and detachably connected to a tongue plate of a seat belt;
    a guide portion of said door frame having a door glass run provided therein, said door glass run including a main body having a surface facing an edge of a door glass, and lips extending from said main body of said door glass run and being in slidable contact with glass surfaces at the end edge of the door glass, for guiding the door glass in a direction of opening or closing the door glass; and
    a wire harness disposed in said guide portion in the longitudinal direction of said door glass run and connected to a warning device for providing a signal when said tongue plate and said buckle assist are unlatched;
    wherein a wire harness holding portion, for holding said wire harness, is provided on a surface of said main body of said door glass run which is opposed to said guide portion, said wire harness holding portion comprising means for clamping said wire harness.

2. The construction of a door glass guide as set forth in claim 1, wherein said wire harness holding portion is located in a recess provided in said guide portion.

3. The construction of a door glass guide as set forth in claim 2, wherein said wire harness holding portion is of a generally C-shape in cross section.

4. The construction of a door glass guide as set forth in claim 1, wherein at least a forward end of said wire harness holding portion is projected into said recess provided in said guide portion.

5. The construction of a door glass guide as set forth in claim 4, wherein said wire harness holding portion is of a generally C-shape in cross section.

6. The construction of a door glass guide as set forth in claim 1, wherein said wire harness holding portion is an opening formed on an end face of said main body of said door glass run opposite to the end edge of the door glass.

7. The construction of a door glass guide as set forth in claim 6, wherein said wire harness holding portion is of a generally C-shape in cross section.

8. The construction of a door glass guide as set forth in claim 1, wherein said wire harness holding portion is of a generally C-shape in cross section.

9. The construction of a door glass guide as set forth in claim 1, wherein said means for clamping said wire harness comprises at least one clamp piece.

10. The construction of a door glass guide as set forth in claim 1, wherein said means for clamping said wire harness comprises a pair of clamp pieces.

11. A construction of a door glass guide in a motor vehicle comprising:
    a door frame in a door of said motor vehicle;
    a buckle assist secured to said door frame and detachably connected to a tongue plate of a seat belt;
    a guide portion of said door frame having a door glass run provided therein, said door glass run including a main body having a surface facing an end edge of a door glass, and lips extending from said main body of said door glass run and being in slidable contact with glass surfaces at the end edge of the door glass, for guiding the door glass in a direction of opening or closing the door glass; and
    a wire harness disposed in said guide portion in the longitudinal direction of said door glass run and connected to a warning device for providing a signal when said tongue plate and said buckle assist are unlatched;
    wherein an expanded portion projecting from said main body of said door glass run into a recess for holding the door glass run formed in said guide portion is provided, said expanded portion including means for holding and clamping said wire harness.

12. The construction of a door glass guide as set forth in claim 11, wherein said means for holding and clamping said wire harness comprises an insertion hole formed in said expanded portion.

* * * * *